United States Patent [19]

Pauzé et al.

[11] 4,180,612

[45] Dec. 25, 1979

[54] HYDANTOIN-POLYESTER COATING COMPOSITIONS

[75] Inventors: Denis R. Pauzé, Scotia, N.Y.; Donald G. Pucci, West Lafayette, Ohio

[73] Assignee: General Electric Company, Schenectady, N.Y.

[21] Appl. No.: 540,633

[22] Filed: Jan. 13, 1975

Related U.S. Application Data

[63] Continuation-in-part of Ser. No. 447,624, Mar. 4, 1974, abandoned.

[51] Int. Cl.$^2$ .................. C08G 18/64; C08G 63/68; C08G 63/70; C08G 73/16
[52] U.S. Cl. .................. 528/289; 260/29.2 N; 260/29.2 TN; 260/DIG. 34; 428/425; 428/480; 528/73; 528/292
[58] Field of Search .......... 260/77.5 R, 77.5 AM, 260/75 NK, 75 N, 29.2 N, 29.2 TN, DIG. 34; 528/71, 80, 289

[56] References Cited

U.S. PATENT DOCUMENTS

| | | | |
|---|---|---|---|
| 2,975,147 | 3/1961 | Abbott et al. | 260/29.2 E |
| 3,021,308 | 2/1962 | Caywood | 260/29.2 E |
| 3,108,085 | 10/1963 | Broadhead | 260/29.2 E |
| 3,223,666 | 12/1965 | Bolton | 260/29.2 E |
| 3,412,054 | 11/1968 | Milligan et al. | 260/29.2 TN |
| 3,528,937 | 9/1970 | Reynolds et al. | 260/29.2 TN |
| 3,639,418 | 2/1972 | Merten | 260/DIG. 34 |
| 3,663,728 | 5/1972 | Hoback et al. | 260/29.2 E |
| 3,699,065 | 10/1972 | Clark | 260/29.2 E |
| 3,759,873 | 9/1973 | Hudak | 260/858 |
| 3,766,118 | 10/1973 | Albers et al. | 260/29.2 N |
| 3,779,991 | 12/1973 | Preston | 260/77.5 R |
| 3,833,529 | 9/1974 | Albers et al. | 260/29.2 N |
| 3,983,058 | 9/1976 | Hirooka et al. | 260/29.2 TN |

OTHER PUBLICATIONS

Das 1,036,426, Bergner Ksverband etc. Aug. 14, 1952.
Amoco Chemicals Corp. (Chicago) Amoco TMA in Melamine Modified 382.
Type Baking Finishes (Bulletin 2571-12-61) 11 pages.

*Primary Examiner*—H. S. Cockeram
*Attorney, Agent, or Firm*—Morgan, Finnegan, Pine, Foley & Lee

[57] ABSTRACT

The invention relates to polymeric coating compositions which are at least partially soluble in water.

Polyesters, polyesterimides, polyesteramides, polyesteramideimides, polyester hydantoins and polyester urethanes are prepared with free carboxyl or carboxylic acid groups. At least part of the carboxylic acid groups are neutralized with amine containing material producing a coating composition which is at least partially soluble in water. The coating compositions are particularly useful as electric insulating coatings or wire enamels which are readily coated on a metallic or other substrate and when cured from coatings having good electrical and physical properties.

15 Claims, No Drawings

HYDANTOIN-POLYESTER COATING COMPOSITIONS

This invention relates to polymeric coating compositions. More particularly, it relates to such coating compositions which are at least partially soluble in water. This application is a continuation-in-part of application Ser. No. 447,624, filed Mar. 4, 1974, and now abandoned.

Resinous coating compositions in the form of varnishes and enamels in which for ease of application the polymer is dissolved in compatible solvents are well known. Such resinous compositions include polyesters, polyesterimides, polyesteramides, polyesteramideimides, polyesterhydantoins, and polyester urethanes, among others. Normally, the solvents used for such materials are organic and include such materials as cresols or cresylic acid, phenol, xylene, N-methylpyrrolidone, dimethylformamide, dimethyl sulfoxide, dimethylacetamide, and the like which, when driven off from the curing coating composition tend to pollute the atmosphere. Such solvents generally are also toxic, flammable, and some cause chemical burns. It would be advantageous from the point of view of complying with evermore strict pollution restrictions, as well as from the point of view of safety, to provide coating compositions of the above types which are at least partially or wholly soluble in water, and it is a primary object of the present invention to provide such coating materials.

Briefly, there are provided according to the present invention polyester compositions or imide, amide, amideimide, hydantoin and urethane variations thereof which are at least partially soluble in water.

The basic polyester compositions of the present invention are widely described in the literature and in U.S. Pat. Nos. such as 2,936,296; 3,249,578; 3,297,785; and 3,312,645, among others, the teachings of such patents being incorporated herein insofar as they are pertinent to the present teaching.

In the preparation of the present polyester compositions, dibasic, tribasic or tetrabasic of polybasic acid material and polyhydric alcohol having at least three hydroxyl groups and diol are combined in varying proportions. For example, the equivalent ratio of diol to polyhydric alcohol typically ranges from about 1 to 0.5 up to about 1 to 1.50, and preferably this ratio is 1 to 0.75. The equivalent proportion of the acid to the alcohol ranges from about 1 to 0.75 up to about 1 to 1.75, and preferably is 1 to 1.05.

In preparing the polyesterimide variation of the present invention, up to about 50 equivalent percent of the total acid constituent can be replaced by other carboxylic acid material containing imide groups such as those produced by the reaction of tricarboxylic acid material with polyamine in a 2 to 1 equivalent proportion.

Polyester hydantoin materials or polyesters containing hydantoin groups can be prepared by substituting for up to about 95 equivalent percent of the hydroxyl group containing material, hydantoin group containing material having two or more hydroxyl groups. Likewise, hydantoin group containing material having two or more acid or carboxylic groups can be substituted for up to about 95 equivalent percent of the dibasic acid material.

In preparing the polyesteramide variation of the present invention, typically up to about 50 equivalent percent of the alcohol constituent can be replaced by polyamine to form amide group containing materials. Amideimides can also be prepared with polyamine.

In preparing polyester urethanes, up to about 40 equivalent percent of the acid can be replaced by polyisocyanate.

It will be realized that the above types of polyesters can be admixed or they can be combined in various proportions as desired by utilizing the desired proportions of the various modifying group containing materials.

The dibasic acids useful in the present connection include oxalic, maleic, succinic, glutaric, adipic, pimelic, suberic, azelaic, sebacic and dodecanedioic acids as well as unsaturated materials including maleic and fumaric materials, among others. Such acids can be expressed by the formula

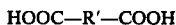

HOOC—R'—COOH where R' is a divalent saturated or unsaturated aliphatic group or one containing a carbon-to-carbon double bond and having from about one to forty carbon atoms, while the anhydrides can be expressed by

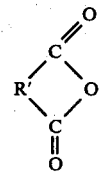

Also included are aromatic anhydrides or diacids or tetracids which are well known to those skilled in the art including, among others, isophthalic acid, terephthalic acid, mixtures thereof and their lower dialkyl esters, pyromellitic dianhydrides, benzophenonetetracarboxylic dianhydride and tetracarboxylicbutane dianhydride and trimesic acid as well as heterocyclic dibasic acids such as di(2-carboxyethyl) dimethylhydantoin. The unsaturated materials are also useful for end-capping or as terminal end groups as well as in the preparation of the intermediate material. The aliphatic and aromatic polybasic acid can be used above or in admixture in the preparation of the original mix of specific acid number and then used interchangeably or together to adjust this number where indicated. Alternatively, of course, all ingredients can be added in the original mix to give a final desired acid number.

Among the polyhydric alcohols having three or more hydroxyl groups are glycerine, 1,1,1-trimethylolethane, sorbitol, mannitol, diglycerol, trimethylolpropane, pentaerythritol, tris(2-hydroxyethyl)isocyanurate, etc.

It will be realized also that in lieu of preparing the polyester variants by adding the modifying ingredients to the original reaction mixture, such variants can be prepared by first preparing the polyester itself and then introducing in well known manner imide or other desired group containing materials as is shown, for example, in the case of polyesterimides in U.S. Pat. No. 3,697,471.

Any of a number of diols can be used including ethylene glycol, neopentyl glycol, butane diol, pentane diol, and the like. Others will occur to those skilled in the art.

Among the tricarboxylic acid materials which are useful are trimellitic anhydride; 2,6,7-naphthalene tricarboxylic anhydride; 3,3',4-diphenyl tricarboxylic anhydride; 3,3',4-benzophenone tricarboxylic anhydride;

1,3,4-cyclopentane tetracarboxylic anhydride; 2,2',3-diphenyl tricarboxylic anhydride; diphenyl sulfone 3,3',4-tricarboxylic anhydride; diphenyl isopropylidene 3,3',4-tricarboxylic anhydride; 3,4,10-terylene tricarboxylic anhydride; 3,4-dicarboxyphenyl 3-carboxyphenyl ether anhydride; ethylene tricarboxylic anhydride; 1,2,5-naphthalene tricarboxylic anhydride; etc. The tricarbocylic acid materials can be characterized by the following formula:

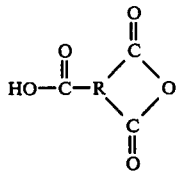

where R is a trivalent organic radical.

The polyamides useful in connection with the present invention may also be expressed by the formula

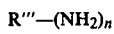

where R''' is a member selected from the class consisting of organic radicals of at least two carbon atoms (both halogenated and unhalogenated) including but not limited to, e.g., hydrocarbon radicals of up to 40 carbon atoms, and groups consisting of at least two aryl residues attached to each other through the medium of a member selected from the class consisting of an alkylene radical of from 1 to 10 carbon atoms, —S—, —SO$_2$—,

and —O—, etc., and n is at least 2.

Among the specific amines useful for the present invention, either alone or in admixture, are the following:
p-xylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
H$_2$N(CH$_2$)$_3$O(CH$_2$)$_2$O(CH$_2$)$_3$NH$_2$
H$_2$N(CH$_2$)$_3$S(CH$_2$)$_3$NH$_2$
H$_2$N(CH$_2$)$_3$N(CH$_3$)(CH$_2$)$_3$NH$_2$
meta-phenylene diamine
para-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylene diamine
polymethylene polyaniline Among the polyisocyanates useful in connection with the invention are those having two or more isocyanate groups, whether blocked or unblocked. Blocked isocyanates using as the blocking constituent phenols or alcohols, among others, can be used and in general provide a higher molecular weight final material which is advantageous in coating compositions. On the other hand, the unblocked isocyanates provide more flexible final materials. At any rate, the blocking material must be evaporated off as much as possible and there is no advantage from the purely reaction point of view to using the blocked material except as stated above. Typical of the blocked polysiocyanates is Mondur S wherein mixtures of 2,4- and 2,6-tolylene diisocyanate are reacted with trimethylol propane and blocked by esterification with phenol in the proportions of three moles of isocyanate, one mole of trimethylol propane, and three moles of phenol. In Mondur SH the isocyanate groups of mixed 2,4- and 2,6-tolylene diisocyanate are blocked by esterification with cresol. Among specific polyisocyanates which are useful alone or in admixture are the following:
tetramethylenediisocyanate
hexamethylenediisocyanate
1,4-phenylenediisocyanate
1,3-phenylenediisocyanate
1,4-cyclohexylenediisocyanate
2,4-tolylenediisocyanate
2,5-tolylenediisocyanate
2,6-tolylenediisocyanate
3,5-tolylenediisocyanate
4-chloro-1,3-phenylenediisocyanate
1-methoxy-2,4-phenylenediisocyanate
1-methyl-3,5-diethyl-2,6-phenylenediisocyanate
1,3,5-triethyl-2,4-phenylenediisocyanate
1-methyl-3,5-diethyl-2,4-phenylenediisocyanate
1-methyl-3,5-diethyl-6-chloro-2,4-phenaylene-diisocyanate
6-methyl-2,4-diethyl-5-nitro-1,3-phenylene-diisocyanate
p-xylylenediisocyanate
m-xylylenediisocyanate
4,6-dimethyl-1,3-xylylenediisocyanate
1,3-dimethyl-4,6-bis-(b-isocyanatoethyl)-benzene
3-(a-isocyanatoethyl)-phenylisocyanate
1-methyl-2,4-cyclohexylenediisocyanate 4,4'-biphenylenediisocyanate
3,3'-dimethyl-4,4'-biphenylenediisocyanate
3,3-dimethoxy-4,4'-biphenylenediisocyanate
3,3'-diethoxy-4,4-biphenylenediisocyanate
1,1-bis-(4-isocyanatophenyl)cyclohexane
4,4'-diisocyanato-diphenylether
4,4'-diisocyanato-dicyclohexylmethane
4,4'-diisocyanato-diphenylmethane
4,4'-diisocyanato-3,3'-dimethyldiphenylmethane
4,4'-diisocyanato-3,3'-dichlorodiphenylmethane
4,4'-diisocyanato-diphenyldimethylmethane
1,5-naphthylenediisocyanate
1,4-naphthylenediisocyanate
4,4',4"-triisocyanato-triphenylmethane
2,4,4'-triisocyanato-diphenylether
2,4,6-triisocyanato-1-methyl-3,5-diethylbenzene
o-tolidine-4,4'-diisocyanate
m-tolidine-4,4'-diisocyanate
benzophenone-4,4'-diisocyanate
biuret triisocyanates
polymethylenepolyphenylene isocyanate The organic solvents where such are used in the present invention are well known to those skilled in the art and include N-methylpyrrolidone, dimethylformamide, dimethyl-sulfoxide, dimethylacetamide, and isopropanol. Where such solvents are used in conjunction with water in the present invention, they are utilized to facilitate the runnability of the final coating composition, that is, to avoid such defects in the finished coatings as blisters and streaking or alternate light and dark spots. While the above solvents can be used alone, it has been found in some cases advantageous in solubilizing the composition in water to add up to about 10 percent by weight of other solvent such as alcohols such as butanol, ethylene glycol, propylene glycol, etc., the cellosolves or Carbitols, including but not limited to butyl Cellosolve, ethyl Cellosolve or other ester materials such as butyl acetate, ethyl acetate, and the like.

Generally, in preparing the present materials the alcoholic ingredients and acid or substituted acidic ingredients are mixed together and heated at a temperature of about 220° C. to an acid number ranging from about 10 to 70 and preferably about 35. Generally, at this point the butyl cellosolve, alcohol or other similar material is added where such solution promoters are indicated. There is then added to the solution an amine group containing material which in reacting with or neutralizing the free carboxyl groups forms salts, making the composition at least partially or wholly soluble in water. Preferably, from thirty to about one hundred percent of the carboxyl groups are so reacted. Among the amine group containing materials useful in this respect are primary and secondary amines. Preferred are tertiary amines which are well known to those skilled in the art and include, among others, dimethylethanolamine, triethanolamine, phenylmethylethanolamine, butyldiethanolamine, phenyldiethanolamine, phenylethylethanolamine, methyldiethanolamine, and triethylamine. Also useful is ammonia or ammonium hydroxide. As pointed out above, final desired acid number reactant can be attained by including all of the necessary reactants in the original reactant mixture.

After the amine group containing material has been added and reacted, the remainder of any water or water and solvent desired to obtain the required solids content is added.

The following examples illustrate the practice of the present invention, it being understood that they are not to be taken as limiting in any way. All parts unless otherwise specified are by weight.

EXAMPLE 1

This example illustrates the preparation of a water soluble polyester coating composition.

A reaction vessel equipped with stirrer, condenser, Dean Stark trap and thermometer was charged with 491 parts of trimethylol propane, 1144 parts of neopentyl glycol and 1959 parts of a dibasic acid mixture consisting of 85 percent isophthalic acid and 15 percent terephthalic acid. The contents were heated to a maximum temperature of 220° C. with stirring until an acid number of 16 was reached. The resin was decanted and allowed to cool to room temperature. There were added to 600 parts of the above solid resin 87 parts of adipic acid, the contents being heated in a vessel similar to that above to 175° C. until an acid number of 50.6 was attained. Then, to 20 parts of the 50.6 acid number material, there were added 41.6 parts of water and 2.4 parts of triethanolamine. The contents were mixed for about 15 hours to produce a water-soluble polyester solution. To this solution there were added 2 parts of hexamethoxymethyl melamine (Cymel) as a curing agent and 2 parts of lactic acid titanate as a curing accelerator. When this final polyester material was coated on a substrate and cured at 200° C. for one hour, a smooth film was obtained.

Any of the usual curing agents can be used in connection with the present coating materials including, among others, those mentioned in U.S. Pat. No. 2,936,296. Likewise, various esters of titanium including those described in U.S. Pat. No. 3,538,186, incorporated by reference herein, have been found useful as cure accelerators.

EXAMPLE 2

This example illustrates the preparation of a water soluble polyesterimide.

Into a reaction vessel equipped as in Example 1 there were charged 95 parts trimethylol propane, 147 parts neopentyl glycol, 105 parts methylene dianiline and 50 parts N-methylpyrrolidone. The mixture was heated to 160° C. with stirring and 204 parts trimellitic anhydride added over a one-hour period at the 160° C. temperature. After complete addition of the trimellitic anhydride, 206 parts of dibasic acid consisting of 85 percent isophthalic acid and 15 percent terephthalic acid were added along with 1.3 parts of tetraisopropyl titanate (TPT), and the mixture heated at 220° C. until an acid number of 25-30 was reached. Then 70 parts of adipic acid were added at 190° C. until an acid number of 45-50 was attained. The resin was then cut with 202 parts of butyl Cellosolve which was followed by the gradual addition of 75 parts dimethylethanolamine and 1143 parts water, the pot temperature being maintained above 80° C. After stirring for 15 minutes, 97 parts of N-methylpyrrolidone and 261 parts of water were added and the polyesterimide solution allowed to cool with stirring. The final viscosity was 160 cps at 25° C. and the resin concentration was 32 percent. When coated on copper wire 0.0403 inch in diameter at a speed of 50 ft/minute and cured at a temperature of 450° C. to 470° C., the smoothness was acceptable at a build of 2.9 to 3.0 mils. The flexibility at 25 percent stretch was 1X and there were only three continuity breaks per 100 feet. The flexibility after heat aging for 100 hours at 175° C. with 0 percent stretch was 1X. The dissipation factor at 170° C. was 5.7 and the cut-through at 1000 granged from about 245° C. to 260° C. The 155° C. heat shock with 0 percent stretch was 2X and the dielectric strength was 8.9. The burn-out OFM was 8.84. The small content of organic solvent was retained to improve the runnability of the material.

EXAMPLE 3

Using a reaction vessel as in Example 1 there were added to the vessel 632 parts trimethylol propane, 980 parts neopentyl glycol and 1959 parts of an 85 percent isophthalic-15 percent terephthalic acid mixture, the reactants being heated at 220° C. to an acid number of 16. The contents were decanted. To 500 parts of this material there were added 74 parts of adipic acid, the mixture being heated to a maximum of 175° C. to an acid number of 49.1.

To 200 parts of the above decanted material there were added 20 parts of maleic anhydride at 100° C., the mixture being heated to 150° C. for one-half hour and cooled. To the cooled resin there were added in succession 233 parts of water, 13 parts of dimethylethanolamine, 46 parts butyl Cellosolve and 187 parts water. The contents were heated while stirring to resin dissolution. When coated on a wire as in Example 2, a smooth coating with good flexibility and a cut-through of 250° C. was obtained.

EXAMPLE 4

This example illustrates the preparation of a water-soluble polyesterimide material.

A reaction vessel as in Example 1 was charged with 209 parts trimethylol propane, 323 parts neopentyl glycol, 305 parts trimellitic anhydride, 90 parts of hexamethylene diamine and one part TPT. The contents were heated at 150° C. for one hour and then were added 274 parts of acid consisting of 85 percent isophthalic acid and 15 percent terephthalic acid, the mixture being heated at 200° C. until a 0.41 percent carboxyl number was obtained. Then 162 parts of adipic acid were added and the resin heated to 220° C. to an acid number of 42.3. To the warm resin there were added 270 parts butyl Cellosolve and 1200 parts of a water solution containing 58 parts of dimethylethanolamine. To the cooled solution there were added 200 parts N-methylpyrrolidone to facilitate runnability. The viscosity of the final solution was about 200 cps at 25° C. at a solids content of 24 percent. When coated on 0.0403 inch copper wire and curing at 450° C. to 470° C. the flexibility at 25 percent stretch was 2X, the dielectric strength was 6.1 KV, the 150° C. heat shock at 0 percent stretch was 4X and the 1000 g cut-through was 227° C.

EXAMPLE 5

This example illustrates the preparation of a polyesterimide material.

To a reaction vessel equipped as in Example 1 there were added 284.4 parts trimethylol propane, 441 parts neopentyl glycol, 300 parts N-methylpyrrolidone and 316 parts methylene dianiline, the contents being heated to 160° C. at which point 612 parts trimellitic anhydride were added. After collection of the water of imidization, 617 parts isophthalic acid and 4 parts TPT were added. The contents were heated to a maximum of 220° C. until an acid number of 35 was reached. There were then added to the vessel 210 parts adipic acid and the mixture heated to 190° C. until an acid number of 32.4 was reached. Then, to 1215 parts of this resulting material there were added at 120° C. in aliquots 2310 parts water, 48.3 parts of ammonium hydroxide solution (28% NH₃), 100 parts N-methylpyrrolidone. The final solids content was 22.7 percent and the Gardner-Holt viscosity was Z-3. When applied to 0.0403 inch copper wire and cured at 450° C. to 470° C., smooth coatings having good flexibility were obtained. A polyester amideimide was prepared by replacing five equivalent percent of the hydroxyl groups in this example with additional methylene dianiline, again providing a good coating material.

EXAMPLE 6

This example illustrates the preparation of polyesteramide material.

To a vessel equipped as in Example 1 there were charged 225 parts N-methylpyrrolidone, 142 parts trimethylol propane, 221 parts neopentyl glycol, 158 parts methylene dianiline, 571 parts isophthalic acid and 2 parts TPT. The contents were heated to a maximum temperature of 220° C. with formed water being collected. When an acid number of 15.5 was reached, 105 parts of adipic acid were added. The mixture was allowed to react until an acid number of 38 was obtained and then 275 parts of butyl cellosolve were added. To the solution which was at 100° C. there were slowly added 115 parts of dimethylethanolamine and 200 parts of water. Additional water was added to attain a solids content of 22.7 percent and the Gardner-Holt viscosity at 25° C. was 100 centistokes. When the resulting wire enamel was coated on 0.0403 inch diameter copper wire at a speed of 10 ft/minute and cured at 450° C. to 470° C., satisfactory smoothness was obtained at a build of 3.0 mils. The flexibility at 25 percent stretch was 1X and the dissipation factor at 180° C. was 16. The 1000 gram cut-through was 221° C. and the 155° C., 0 percent stretch heat shock was 5X. The dielectric strength was 6.7 and the burn-out OFM was 9.0.

EXAMPLE 7

This example illustrates the preparation of a hydantoin polyester material.

To a reaction vessel equipped as in Example 1 above there were charged 114 parts trimethylol propane, 225 parts N-methylpyrrolidone, 176 parts neopentyl glycol, 161 parts di(2-hydroxyethyl)dimethylhydantoin, 340 parts isophthalic acid, 100 parts of terephthalic acid and 2 parts TPT. The contents of the vessel were heated to a maximum of 220° C. with water being collected until an acid number of 24.5 was reached. Then 58 parts of adipic acid and 98 parts of di(2-carboxylethyl) dimethylhydantoin were added, the temperature being maintained at 220° C. until an acid number of 30.7 was obtained. At this point 225 parts of butyl cellosolve were added to the cooling vessel followed by the addition of a solution of 115 parts dimethylethanolamine and 200 parts of water followed by the addition of 200 parts of water. The viscous solution was reduced to 19 percent solids by adding an 80 to 20 by weight equal mixture of water and N-methylpyrrolidone butyl Cellosolve to a final Gardner-Holt viscosity of Z. When coated on wire at 50 ft/minute to a build of about 2.5 to 2.8 mils and cured at 450° C. to 470° C., the 25 percent flexibility was 2X. The dissipation factor at 180° C. was 4.2 and the 155° C., 0 percent heat shock was 2X, the dielectric strength was 9.0 and the burn-out OFM was 9.0.

EXAMPLE 8

This example illustrates the preparation of a polyesterimide having an imide content of about 20 percent of the total equivalent acid groups.

To a reaction vessel equipped as in Example 1 there were charged 142 parts trimethylolpropane, 222 parts neopentyl glycol, 132.5 parts methylene dianiline, 257 parts trimellitic anhydride, 225 parts N-methyl pyrrolidone, 328 parts of acid consisting of 85 percent isophthalic acid and 15 percent terephthalic acid and 20 parts tetraisopropyl titanate (TPT). The contents of the vessel were heated to a maximum temperature of 220° C. with water being collected until an acid number of 22 was obtained. Then 105 parts of adipic acid were added and reached at 220° C. until an acid number of 47.5 was obtained. The flask was allowed to cool to 150° C. at which point 250 parts of a 1:1 by weight solution of butanol and propylene glycol were slowly added. There were then added to the warm reaction mixture 117 parts of dimethylethanolamine in 200 parts of water. Finally, 1800 parts of water were added to a final solids content of 27.6 percent by weight. The enamel so prepared was filtered and applied to 18 AWG wire to a build of 2.9 to 3.1 mils at a speed of 55 ft/minute and cured at 300° C. to 475° C. It was found that the 25 percent flexibility was 1X, the dissipation factor at 170° C. was 5.1, the cut-through was 254° C., the dielectric strength was 9.2 KV, the burn-out OFM was 8.7 and the 0 percent heat shock at 150° C. was 1X.

EXAMPLE 9

This is an example of the preparation of a water-soluble polyesterimide containing no organic solvent during its synthesis.

There were charged to a reaction vessel equipped as in Example 1, 142 parts trimethylolpropane, 222 parts neopentyl glycol, 158 parts methylene dianiline, 356 parts dimethylterephthalate, and 20 parts tetraisopropyl titanate (TPT). The contents were raised to a temperature of 150° C. and held until solution, at which point 306 parts of trimellitic acid were added. The contents were then heated to 240° C. with methanol and water being given off. At the point where the viscosity increased markedly, 105 parts of adipic acid were added with heating, continuing to a percent carboxyl of 3.0 or an acid number of 31. This solution was allowed to cool to 150° C. at which point 250 parts of a 1:1 by weight solution of butyl Cellosolve and propylene glycol was added slowly. Then 95 parts of dimethylethanolamine in 200 parts of water were added slowly. The enamel so prepared was applied to 18 AWG copper wire at a speed of 55 ft/minute to a build of about 2.7 to 3.0 mils and cured at 300° C. to 475° C. It was found that the wire so coated had a 25 percent flex of 1X, a dissipation factor at 170° C. of 7.7, a cut-through of 201° C., a 0 percent heat shock at 150° C. of 1X, a dielectric strength of 7.0 KV and a burn-out OFM of 9.5.

EXAMPLE 10

This example illustrates the preparation of a polyesteramideimide enamel where all materials are charged to the reaction vessel at once.

There were added to a reaction vessel equipped as in Example 1, 142 parts trimethylol propane, 266 parts neopentyl glycol, 158 parts methylene dianiline, 257 parts trimellitic anhydride, 225 parts N-methylpyrrolidone, 335 parts of a mixture of 85 percent by weight isophthalic acid-15 percent by weight terephthalic acid mixture along with 20 parts tetraisopropyl titanate (TPT) and 105 parts of adipic acid. The contents were heated at a maximum temperature of 200° C. to an acid number of 26.9, the contents then being allowed to cool to 170° C. at which point 250 parts of butanol were slowly added. Then 51 parts of dimethylethanolamine were added in 200 parts of water for 100 percent neutralization. An additional amount of 1800 parts of water were then added. The final enamel had a solids content of 30 percent by weight. When applied to 18 AWG copper wire at a speed of about 50 ft/minute to a build of about 3 mils and cured at a temperature of about 300° C. to 475° C., the flexibility at 25 percent storage was 1X, the dissipation factor at 170° C. was 5.1 and the cut-through was 218° C. The zero percent heat shock at 150° C. was 2X and the dielectric strength was 9.3 KV and the burn-out OFM was 8.3.

EXAMPLE 11

To a reaction vessel equipped as in Example 1 above there were charged 142 parts trimethylolpropane, 266 parts neopentyl glycol, 79 parts methylene dianiline, 153 parts trimellitic anhydride, 20 parts tetraisopropyl titanate (TPT), 94.7 parts adipic acid and 437 parts of 85 percent isophthalic acid and 15 percent terephthalic acid, the contents being heated at 220° C. with water collected until an acid number of about 42.0 was obtained. The contents were then cooled and 306 parts of butanol added. Then to the hot solution a mixture of 117 parts dimethylethanolamine in 200 parts of water were added slowly. After reaction, 1188 parts of further water were added. The resulting enamel was adjusted to 30.2 percent solids with water and had a viscosity of Z-¾ at 25° C. When applied to 18 AWG copper wire at 55 ft/minute to a build of 2.9 to 3.1 mils and cured at 300° C. to 475° C., the flexibility at 25 percent stretch was 1X, the 170° C. dissipation factor was 15, the 2000 g cut-through was 220° C., the 150° heat shock at 0 percent stretch was 1X, the dielectric strength was 13.9 KV and the burnout OFM was 5.4.

EXAMPLE 12

A vessel equipped as in Example 1 was charged with 142 parts trimethylolpropane, 222 parts neopentyl glycol, 158 parts methylene dianiline, 225 parts N-methylpyrrolidone, 306 parts trimellitic anhydride, 305 parts of acid containing 85 percent isophthalic acid and 15 percent terephthalic acid, and 20 parts of tetraisopropyl titanate (TPT), the contents being heated at 230° C. to an acid number of 21. Then 105 parts of adipic acid were added and the contents heated at 220° C. to an acid number of 48. The contents were slowly cut with 250 parts of butanol and cooled to 140° C. A total of 90 parts of dimethylethanolamine in 200 parts of water were slowly added to the warm solution and the water then added until the solids content was 30.5 percent. To a portion of the above material, one percent by weight of propylene glycol was added. When this material was applied to 18 AWG copper wire at a speed of 55 ft/minute to a build of about 2.9 mils and cured at 300° C. to 475° C., the flexibility at 25 percent stretch was 1X, the dissipation factor at 170° C. was 4.8, the cut-through was 262° C., the 150° C. heat shock with 20 percent stretch was 4X, the dielectric strength was 10.6 KV and the burn-out OFM was 10.4.

To another portion, one percent of tris-hydroxyethyl isocyanurate based on the solids were added. When this material was applied to 18 AWG copper wire at 55 ft/minute to a build of 2.9 to 2.1 and cured at a temperature of 300° C. to 475° C., the flexibility at 25 percent stretch was 1X, the dissipation factor at 170° C. was 4.3, the cut-through was 262° C., the 150° C. heat shock with 20 percent stretch was 3X, the dielectric strengthf was 9.1 KV and the burn-out OFM was 9.5.

There are provided by the present invention polyester resin coating solutions, and such coating solutions in which the polyester is variously modified with imide, amide, urethane and hydantoin groups or mixtures thereof which are characterized by good coating characteristics and particularly by their ability to be dissolved at least partly or wholly in water, thus representing a decided improvement over normal organic solvent solutions of such materials.

It will be realized that in addition to their use as coating compositions, the present materials can be used in many applications including the preparation of laminates in which they are used to impregnate the layers or laminae. They are also useful in preparing composites.

What we claim as new and desired to secure by Letters Patent of the U.S. is:

1. A coating composition comprising a polyester hydantoin containing free carboxyl groups, at least part of the free carboxyl groups in the polyester moiety being neutralized with a compound selected from the group consisting of an amine, ammonia, and ammonium hydroxide.

2. A coating composition as defined in claim 1 where from about 30 to 100 percent of the free carboxyl groups are neutralized.

3. A coating composition as defined in claim 1 wherein the amine is tertiary amine.

4. A coating composition as defined in claim 3 wherein the amine is dimethylethanolamine.

5. A coating composition as defined in claim 1 wherein the polyester moiety of said polyester hydantoin is the reaction product of acid material, polyhydric alcohol having at least three hydroxyl groups and diol.

6. A substrate coated with a composition comprising the composition of claim 1.

7. A laminate cohered with the composition of claim 1.

8. A composite cohered with the composition of claim 1.

9. A coating composition comprising a polyester hydantoin containing free carboxyl groups, at least part of the free carboxyl groups in the polyester moiety being neutralized with an amine.

10. A coating composition as defined in claim 8 wherein said polyester moiety is the reaction product of acid material, polyhydric alcohol having at least three hydroxyl groups and diol.

11. A coating composition as defined in claim 10 wherein up to about 95 equivalent percent of the hydroxyl moiety is hydantoin group containing moiety having two or more hydroxyl groups.

12. A coating composition as defined in claim 10 wherein up to 95 equivalent percent of the acid reactant is hydantoin group containing moiety having two or more carboxylic acid groups.

13. A coating composition as defined in claim 10 wherein up to 95 equivalent percent of the hydroxyl containing moiety is hydantoin group containing moiety having at least two carboxylic acid groups and at least two hydroxyl groups.

14. The process of preparing a water soluble polyester containing coating composition which comprises reacting a polybasic acid material, polyhydric alcohol having at least three hydroxyl groups, diol, and a hydantoin group containing material selected from the group consisting of hydantoin group containing moiety having two or more hydroxyl groups, hydantoin group containing moiety having two or more carboxylic acid groups, and hydantoin group containing moiety having at least two carboxylic acid groups and at least two hydroxyl groups to form a polyester hydantoin having an acid number of about 20 to 60 and further reacting said polyester hydantoin with a compound selected from the group consisting of an amine, ammonia and ammonium hydroxide to neutralize at least part of the free carboxyl groups.

15. The process as defined in claim 14 wherein said acid number is obtained by the addition of polybasic acid.

* * * * *